May 6, 1930. W. F. STOODY ET AL 1,757,601
WELDING ROD
Filed Jan. 30, 1928
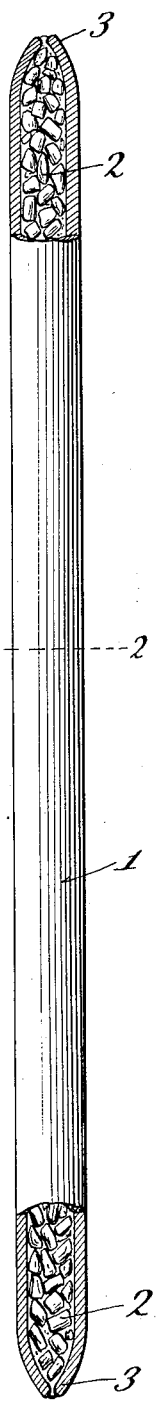
Inventors.
Winston F. Stoody.
Shelley M. Stoody.
Norman W. Cole.
by Hazard and Miller
Attorneys.

Patented May 6, 1930

1,757,601

UNITED STATES PATENT OFFICE

WINSTON F. STOODY, SHELLEY M. STOODY, AND NORMAN W. COLE, OF WHITTIER, CALIFORNIA, ASSIGNORS TO STOODY COMPANY, OF WHITTIER, CALIFORNIA, A CORPORATION OF CALIFORNIA

WELDING ROD

Application filed January 30, 1928. Serial No. 250,697.

Our invention relates to a welding rod, and it is an object of this invention to provide a simple and efficient welding rod in the shape of a tubular container consisting of mild steel or other metal alloy of a comparatively low melting point, said tubular welding rod containing particles or pieces of a material or an alloy of exceptional hardness and toughness suitable for facing cutting, drilling and boring tools.

Our invention consists of the construction and arrangement of parts hereinafter described and claimed.

Referring to the accompanying drawings forming a part of this specification,

Figure 1 is an elevation partly in section, of a welding rod embodying our invention.

Fig. 2 is a horizontal section taken on the line 2—2 of Fig. 1.

In the drawings, 1 indicates a tube made of mild steel or any other metal or alloy having a comparatively low melting point such as mild steel. The tube 1 is filled with broken pieces or particles 2 of an alloy, carbide or element such as black diamonds of great hardness and toughness; but we prefer to use an alloy set forth in our copending application for an alloy, containing tungsten and carbon, Serial No. 250,699 filed January 30, 1928. The ends of the tube 1 are preferably pinched together as at 3 so as to confine the particles within the tube.

In the use of the welding rod the tools are faced with a layer or skin of mild steel or metal of which the tube 1 is composed, in which layer the particles or pieces 2 are embedded. We prefer to use an acetylene torch in melting the welding rod. The particles 2 of the alloy or element having a considerable higher melting point than the mild steel of which tube 1 is composed, will not be affected by the acetylene torch. The metal of the tube 1 serves as a binder holding the particles 2 to the face of the tool. The skin or layer of metal in which the particles 2 are embedded is then provided with a surface layer of a hard tool steel, though the second layer of metal may be omitted. The method and resulting product of such facing of tools is described and claimed in our copending application, filed January 30, 1928, Serial No. 250,-698. The second layer of hard tool steel may be omitted, and the particles 2 embedded in the metal of the welding rod deposited on the face of the tool, may be used without the second layer of metal, and will produce good results.

Various changes may be made in the construction and arrangement of parts of our welding rod, without departing from the spirit of our invention as claimed.

We claim:

1. A welding rod comprising a tubular container closed at one end and made of mild steel, and pieces of a hard alloy having a higher melting point which will not be so materially affected by a welding temperature as to lose its original identity and mix with the mild steel, contained in said container.

2. A welding rod comprising a tubular container made of a metal of a comparatively low melting point and pieces of an alloy containing tungsten and carbon within said container.

3. A welding rod comprising a metal of comparatively low melting point, and pieces of an alloy containing tungsten and carbon associated therewith.

4. A welding rod comprising a granular tungsten carbide surrounded by a metal of comparatively low melting point.

5. A welding rod comprising a granular mass of an alloy containing tungsten and carbon inclosed within a metal of comparatively low melting point, the particles of the alloy being of such size that they will not be completely melted or mixed with the metal under a welding temperature.

6. A welding rod comprising a granular mass of an alloy of relatively high melting point inclosed within a metal of comparatively low melting point, the particles of the alloy being of such size that they will not be completely melted or mixed with the metal under a welding temperature.

7. A welding rod comprising a mass of granular tungsten carbide held together in rod like form by a metal of comparatively low melting point.

In testimony whereof we have signed our names to this specification.

WINSTON F. STOODY.
SHELLEY M. STOODY.
NORMAN W. COLE.

DISCLAIMER 1,757,601.—*Winston F. Stoody, Shelley M. Stoody*, and *Norman W. Cole*, Whittier, Calif. WELDING ROD. Patent dated May 6, 1930. Disclaimer filed June 27, 1938, by the assignee, *Stoody Company*.

Hereby enters this disclaimer as follows:

1. Page 1, lines 24 and 25 of the words "or element such as black diamonds".

2. So much of claim 1 of said patent as is in excess of the following:

1. A welding rod comprising a tubular container closed at one end and made of mild steel and pieces of a hard alloy namely tungsten carbide having a higher melting point which will not be so materially affected by welding temperature of that created by an acetylene torch as to lose its original identity and mix with the mild steel when subjected to the welding temperature created thereby in the ordinary course of welding, contained in said container.

3. So much of claim 2 as is in excess of the following:

2. A welding rod comprising a tubular container made of a metal of comparatively low melting point capable of being fused to the tool it is desired to face, and pieces of an alloy containing tungsten and carbon and composed principally of tungsten carbide within said container.

4. So much of claim 3 as is in excess of the following:

3. A welding rod comprising a metal of comparatively low melting point capable, when molten, of dissolving tungsten carbide, and pieces of an alloy containing tungsten and carbon composed principally of tungsten carbide associated therewith.

5. So much of claim 5 as is in excess of the following:

5. A welding rod comprising a granular mass of an alloy containing tungsten and carbon and composed principally of tungsten carbide enclosed within a metal of comparatively low melting point, the particles of the alloy being of such size that they will not be completely melted or mixed or dissolved with the metal under the welding temperature of an oxy-acetylene torch.

6. So much of claim 6 as is in excess of the following:

6. A welding rod comprising a granular mass of an alloy of relatively high melting point, namely tungsten carbide, enclosed within a metal of comparatively low melting point, namely mild steel, the particles of the alloy being of such size that they will not be completely melted or mixed or dissolved with the mild steel under the welding temperature of an acetylene torch.

[*Official Gazette July 26, 1938.*]